(12) United States Patent
Lauinger et al.

(10) Patent No.: US 7,097,583 B2
(45) Date of Patent: Aug. 29, 2006

(54) POWER-BRANCHED TRANSMISSION WITH STEPLESSLY ADJUSTABLE TRANSMISSION RATIO

(75) Inventors: Christian Lauinger, Baden-Baden (DE); Martin Vornehm, Bühl (DE); Peter Tenberge, Chemnitz (DE); Andreas Englisch, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/110,491

(22) Filed: Apr. 20, 2005

(65) Prior Publication Data

US 2005/0255956 A1 Nov. 17, 2005

Related U.S. Application Data

(63) Continuation of application No. PCT/DE03/003492, filed on Oct. 21, 2003.

(30) Foreign Application Priority Data

Oct. 22, 2002 (DE) .............................. 102 49 318

(51) Int. Cl.
  F16H 37/02 (2006.01)
  F16H 3/44 (2006.01)
(52) U.S. Cl. .................... 475/214; 475/302; 74/329
(58) Field of Classification Search .............. 475/210, 475/211, 214, 215, 217, 219, 302; 74/329, 74/331
See application file for complete search history.

(56) References Cited

U.S. PATENT DOCUMENTS

| | | | |
|---|---|---|---|
| 4,553,450 A | 11/1985 | Gizard | 475/212 |
| 4,599,916 A | 7/1986 | Hirosawa | 475/210 |
| 5,055,094 A | 10/1991 | Cataldo | 475/211 |
| 5,564,998 A | 10/1996 | Fellows | 475/216 |
| 5,853,343 A * | 12/1998 | Eggert et al. | 475/210 |
| 5,888,161 A * | 3/1999 | McCarrick et al. | 475/43 |
| 6,045,477 A * | 4/2000 | Schmidt | 475/207 |
| 6,306,057 B1 * | 10/2001 | Morisawa et al. | 475/5 |
| 6,849,020 B1 * | 2/2005 | Sumi | 475/214 |
| 6,945,897 B1 * | 9/2005 | Vornehm | 475/211 |
| 2004/0224811 A1 * | 11/2004 | Vornehm et al. | 475/207 |

OTHER PUBLICATIONS

Basedow, G. "Stellgetriebe mit genauerer Einstellmöglichkeit und erhöhter Leistung," *Antriebstechnik*, vol. 26, No. 6, 1987, pp. 40 through 46.

* cited by examiner

*Primary Examiner*—Tisha Lewis
(74) *Attorney, Agent, or Firm*—Alfred J. Mangels

(57) ABSTRACT

A power-branched transmission having a steplessly adjustable transmission ratio. An input-side distributor transmission includes an input gear that is nonrotatably connected with an input shaft coupled to an engine. The power-branched transmission includes an output shaft and two clutches. The input gear of the distributor transmission is rotatably coupled with an input shaft of a variable speed drive unit. An output gear of the distributor transmission is rotatably engaged with an intermediate shaft that is arranged in a functionally parallel manner relative to the variable speed drive unit and is rotatably engaged with an output shaft of the variable speed drive unit. The intermediate shaft is operatively coupled with the output shaft through a first clutch and the input shaft of the variable speed drive unit is operatively coupled with the output shaft through a second clutch.

11 Claims, 8 Drawing Sheets

| Shift Diagram | | | |
|---|---|---|---|
| | KR | K1 | K2 |
| R | x | — | — |
| N | — | — | — |
| D-LOW | — | x | — |
| D-HIGH | — | — | x |

| Variation No. | Transmission Configuration | Range LOW $M_{SS1}/M_{Mot}$ | Range HIGH $M_{SS1}/M_{Mot}$ |
|---|---|---|---|
| 1 |  | $-i_0/(i_0 - 1)$ | $-i_1/[(i_0 - 1) \times i_2 \times i_{Var}]$ |
| 2 |  | $-i_0$ | $-i_1 \times (i_0 - 1)/[i_2 \times i_{Var}]$ |
| 3 |  | $(i_0 - 1)$ | $i_0 \times i_1/[i_2 \times i_{Var}]$ |
| 4 |  | $1/(i_0 - 1)$ | $i_0 \times i_1/[(i_0 - 1) \times i_2 \times i_{Var}]$ |
| 5 |  | $-1/i_0$ | $i_1 \times (i_0 - 1)/(i_0 \times i_2 \times i_{Var})$ |
| 6 |  | $-(i_0 - 1)/i_0$ | $i_1/(i_0 \times i_2 \times i_{Var})$ |

POWER-BRANCHED TRANSMISSION WITH STEPLESSLY ADJUSTABLE TRANSMISSION RATIO

The invention relates to a power-branched transmission with steplessly adjustable transmission ratio.

Transmissions with steplessly adjustable transmission ratio are increasingly favored in passenger vehicles, not only for the driving-comfort made possible with them, but also because of a possible reduction in fuel consumption. Their power capacity is generally limited by the torque transmission capability, and the spread of the transmission ratio range of the variator. The variator can be constructed in the generally known form of a belt-driven conical-disk transmission with two conical disk pairs, around which circulates an endless torque-transmitting means, such as a plate-link chain. The transmission ratio adjustment takes place by the opposite change of the distance between the disks of the conical disk pairs. The variator can for example also be constructed in an already known way as a friction wheel drive, in which the effective radius, on which wheels or disks or other rolling bodies roll on each other, is changed.

It is known to increase the range of the spread of such transmissions with a continuously adjustable transmission ratio through the use of power-branching, whereby in one power-branched range the torque transmission takes place through the variator, as well as through a fixed transmission ratio arranged in parallel to the variator, and that the torque transmission in the not branched range only takes place through the variator. A summing transmission, which is generally arranged at the output side of the power-branched transmission, that is, behind the variator, brings the two branches together on the output shaft. The transmission ratio range of the variator is passed through in opposite directions in the power-branched and the non-power-branched ranges, so that the transmission enables an increased spread as compared with the variator. The summing transmission can be constructed as a simple planetary transmission, or as a planetary coupled transmission, which is composed of two planetary planes.

The invention is based on the object of producing a transmission with a steplessly adjustable transmission ratio, which has a high transmission ratio spread as well as a high torque transmission capacity.

That object is solved by means of a power-branched transmission with a steplessly adjustable transmission ratio that contains:

An input-side distributor transmission with an input gear that is nonrotatably connected or is connected through a starting clutch with an input shaft,
  a variator;
  an output shaft; and
  two clutches, whereby
  the input gear of the coupling mechanism is in rotational engagement with an input shaft of the variator;
  an output gear of the coupling mechanism is in rotational engagement with an intermediate shaft arranged functionally in parallel to the variator, and which is in rotational engagement with an output shaft of the variator;
  the intermediate shaft can be brought into rotational engagement with the output shaft through a first clutch; and
  the input shaft can be brought into rotational engagement with the output shaft through a second clutch.

The transmission in accordance with the invention concerns a three-shaft transmission, which is constantly operated in power-branched mode, whereby the torque transmission capability as well as the spread of the transmission ratio are increased.

Advantageously, the distributor transmission is constructed as a simple planetary transmission, or a planetary coupled transmission that is controlled as two planetary planes.

Because of the constant power-branching already mentioned above, and the constant turning of the distributor transmission associated therewith, it is of advantage to construct the simple planetary transmission, or the planetary coupled transmission with negative stationary transmission ratios. Thereby, the generated turning power, which reduces the efficiency, and therefore always results in increased fuel consumption, can be minimized. Especially for construction space purposes the stationary transmission ratios of the simple planetary transmissions can be limited to transmission ratios of −1.5 to about −2.5.

In a preferred embodiment the distributor transmission is a simple planetary transmission. Thereby, the input shaft is nonrotatably connected with a planet carrier, whose planet gears are in rotational engagement with a sun gear, which is in rotational engagement with the intermediate shaft, and in rotational engagement with a ring gear, which is nonrotatably connected with the input shaft of the variator.

In a further preferred embodiment of the power-branched transmission in accordance with the invention, the distributor transmission is a coupled planetary transmission, which is composed of two coupled planetary transmissions. Thereby, the input shaft is nonrotatably connected with a planet carrier, whose planet gears are in rotational engagement with a sun gear, which is in rotational engagement with the intermediate shaft, and in rotational engagement with a ring gear, which is nonrotatably connected with a second planet carrier, whose planet gears are in rotational engagement with the sun gear, and with a further ring gear, which is nonrotatably connected with the input shaft of the variator.

In a further embodiment of the power-branched transmission, whereby the distributor transmission is constructed as a coupled gear, the input shaft is nonrotatably connected with a planet carrier, whose planet gears are in rotational engagement with a sun gear and a ring gear, whereby the sun gear is nonrotatably connected with the input shaft of the variator, and the ring gear is nonrotatably connected with a further planet carrier, whose planet gears are in rotational engagement with the sun gear and a further ring gear, which is in rotational engagement with the intermediate shaft.

For implementing a reverse gear, the output shaft of the variator is nonrotatably connected with a reverse gear through a reverse clutch.

In order to diminish any comfort-reducing jerks when shifting between the two power branches, the transmission ratios between the individual gears of the transmission are selected advantageously in such a way that in the range shift resulting from the actuation of the first and second clutches, the jumps in the transient outputs of a first and second conical disk pair of the variator are minimal.

With the power-branched transmission in accordance with the invention new application areas are opened up for comfortable automatic transmissions with steplessly changeable transmission ratios, also for engines with higher torque, for example in the range of 500 Nm and higher.

The invention will be explained below by means of schematic drawings by way of example and in further details.

In the drawings there is shown:

FIG. 1 a block schematic of an embodiment of a transmission in accordance with the invention, whereby the distributor transmission is implemented as a simple planetary transmission, or as a coupled planetary transmission, FIG. 1a a block schematic of an embodiment of a transmission in accordance with the invention, whereby the distributor transmission is implemented as a simple planetary transmission, FIG. 2 a simplified schematic of the transmission in accordance with FIG. 1a, FIG. 3 the shift diagram of the transmission in accordance with FIG. 1a;

FIG. 4 possible diagrams of transmissions in accordance with the invention with a distributor transmission implemented as a simple planetary transmission, FIG. 5 the overall transmission ratio as a function of the variator transmission ratio for variations number 1, 4, and 5 in accordance with FIG. 4, FIG. 6 the rotational speeds of the conical disk pairs normalized for the engine rotational speed as a function of the overall transmission ratio of variation 1 of FIG. 4, FIG. 7 the effective torque at the conical disk pair 1 normalized for the engine torque as a function of the overall transmission ratio for variation 1 of FIG. 4, FIG. 8 the time dependency of the variator transmission ratio (iVar), the overall transmission ratio ($i_{Ges}$), the engine rotational speed (nMot), and the transient outputs, which are caused by the mass moments of inertia, of disk set 1, and disk set 2 (PdynSS1, and PdynSS2) during a kickdown downshift with range shift of variation 1 in accordance with FIG. 4, FIG. 9 a block schematic of an embodiment of a transmission in accordance with the invention, whereby the distributor transmission is implemented as a coupled planetary transmission and FIG. 10 a block schematic of a further modified variation of the transmission whereby the distributor transmission is also implemented as a planetary coupled gear.

FIG. 11 a graph of a chain load as a function of various parameter sets for a transmission with a simple planetary transmission in accordance with variation 4 of FIG. 4, FIG. 12 a graph of the overall efficiency as a function of the overall transmission ratio for a transmission with a simple planetary transmission with different parameter sets of variation 4 in accordance with FIG. 4, FIG. 13 a graph of a chain load as a function of various parameter sets for a transmission with coupled planetary transmissions in accordance with FIG. 10.

In accordance with FIG. 1, a crankshaft 2 of a not shown internal combustion engine, is connected through a starting clutch 4 with the input shaft 6 of a power-branched transmission designated overall with the number 8, whose output shaft is designated with 10. The arrows at the crankshaft 2 and at the output shaft 10 designate the direction of torque flow through the transmission, when the not shown internal combustion engine is propelling.

The transmission 8 contains a coupling mechanism 12, and a variator 14 with a first conical disk pair 16 and a second conical disk pair 18. The construction of the variator is known. The first conical disk pair is nonrotatably connected with an input shaft 20 of the variator. The second conical disk pair 18 is nonrotatably connected with an output shaft 22 of the variator.

The input shaft 6 serves as input shaft for the distributor transmission 12, which is shown in more detail in FIG. 1a, 9, and 10. On the output side, the intermediate shaft 32 is nonrotatably connected through a clutch K1 with a coupling gear 38, which meshes with an output gear 40, which is nonrotatably connected with the output shaft 10.

The input shaft 20 can be nonrotatably connected with the output shaft 10 through a clutch K2.

The output shaft 22 of the variator is nonrotatably connected with a reverse gear 42 through a clutch KR, which is provided in a known way for a reverse drive of the motor vehicle. The transmission ratios effected by the individual elements of the described transmission are each designated with i and an associated index.

FIG. 1a shows an embodiment of a distributor transmission 12 as a single-planetary transmission 12'. Thereby, the input shaft 6 is nonrotatably connected with the carrier 24 of the distributor transmission 12. The planet gears 26 supported on the carrier 24 mesh with the internal tooth system of a ring gear 28, which is nonrotatably connected with the input shaft 20.

The planet gears 26 further mesh with a first tooth system of a sun gear 30, which forms the output gear of the distributor transmission in the illustrated example, and which meshes with an idler gear 34, which is nonrotatably connected with an intermediate shaft 32. The intermediate shaft 32 is arranged functionally parallel to the variator 14. The idler gear 34 meshes with a gear 36 nonrotatably connected with the output shaft 22.

FIG. 1b shows a transmission with a distributor transmission 112, which is constituted by two coupled planetary transmissions 112a and 112b. Thereby, the sun gear 130b of the planetary transmission 112b and the carrier 124a of the planetary transmission 112a are connected with the input shaft 106. The carrier 124b of the planetary transmission 112b is rotatably supported on the input shaft 106, and is connected with the shaft 122 of the disk set 116 through an idler gear 160 supported on the intermediate shaft 132. Between the idler gear 130 and the shaft 122 the transmission ratio ii2 is set, and between the carrier 124b and the idler gear 160 the transmission ratio i1 is set. The ring gear 128a of the planetary transmission 112a is coupled with the carrier 124b of the planetary transmission 122b and forms the transmission ratio i3. The ring gear 128b of the planetary transmission 112b is coupled with the intermediate shaft 132, and the sun gear 130a of the planetary transmission 112a is coupled with the shaft 120 of the first disk set 114. The shaft 120 can be coupled with the intermediate shaft 132 by means of a clutch K1 while forming a transmission ratio i4.

In neutral gear (N) all clutches are disengaged.

In the range of high transmission ratios, that is, low motor vehicle speeds (Drive-Low) clutch KR is disengaged, clutch K2 is disengaged, and clutch K1 is engaged. The output on the output shaft 10 thereby takes place through the intermediate shaft 32.

In the range of low transmission ratios, or higher motor vehicle speeds (D-High) only the clutch K2 is engaged.

As can be seen, the transmission is operated in power-branched mode at higher transmission ratios, as well as at lower transmission ratios, that is, only a part of the total transmitted torque is transmitted through the variator 14. Thereby, the load on the variator 14 as well as on the chain revolving around the two conical disk pairs 16, and 18 is reduced, so that higher torques are possible as compared with traditional transmissions.

Figure 1:
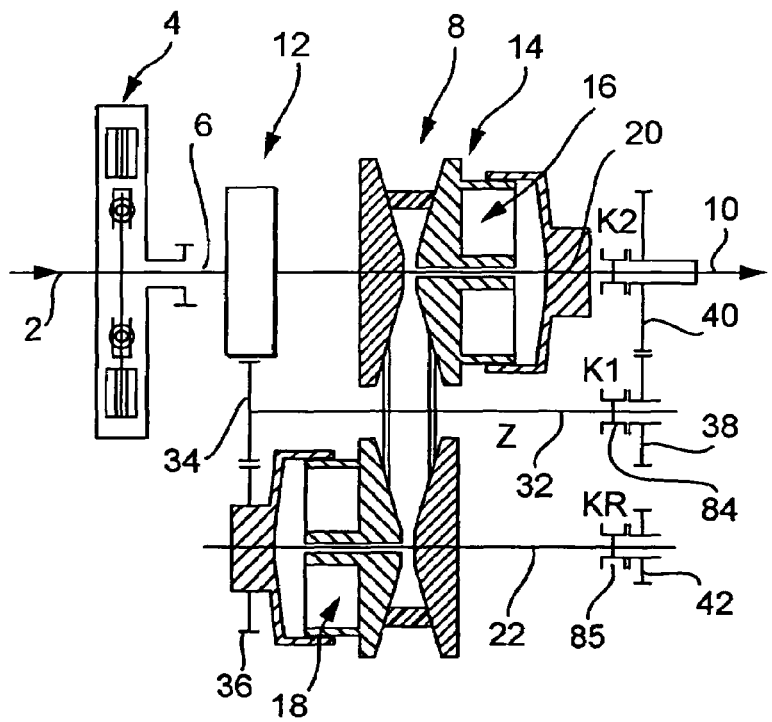
Figure 4:
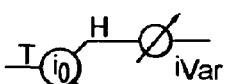
Figure 4:
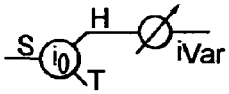
Figure 4:
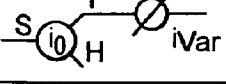
Figure 4:
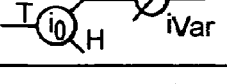
Figure 4:
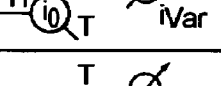
Figure 4:
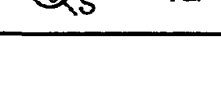

FIG. 4 shows by means of the representations in the transmission configuration column that depending on the connection of the elements of the simple planetary transmission in accordance with FIG. 1 six different variations are possible.

The third column (range Low $M_{SS1}/M_{Mot}$) gives the ratio of the torque of the first disk pair 16 to the torque of the drive shaft 6 when the transmission is in the Low range. The fourth column (range High $M_{SS1}/M_{Mot}$) gives the ratio of the torque of the first disk pair 16, or the input shaft 20 of the variator to the drive shaft 6 when the transmission is in the High range.

For the design of the transmission, or the six transmission configurations, the stationary gear ratio $i_o$ and the torque that is normalized to the engine torque at the first conical disk pair 16 in the High range, however, are directly predetermined at the shift point between the two ranges. If, for simplification purposes, the fixed transmission ratios $i_1$ and $i_3$ (see FIG. 1) are initially assumed to be identical, all transmission ratios are determined with those presettings. By presetting $i_o$ the ratio of the rotational speeds of the input shaft 10 and the drive shaft 6 is determined in the Low range. If construction space is needed, there is a limitation to negative stationary transmission ratios are limited to values between −1.5 to −2.5, variations 2, 3, and 6 are eliminated because the stated torque ratio is distinctly higher than 1, and therefore the danger of high chain damage exists.

Figure 5:
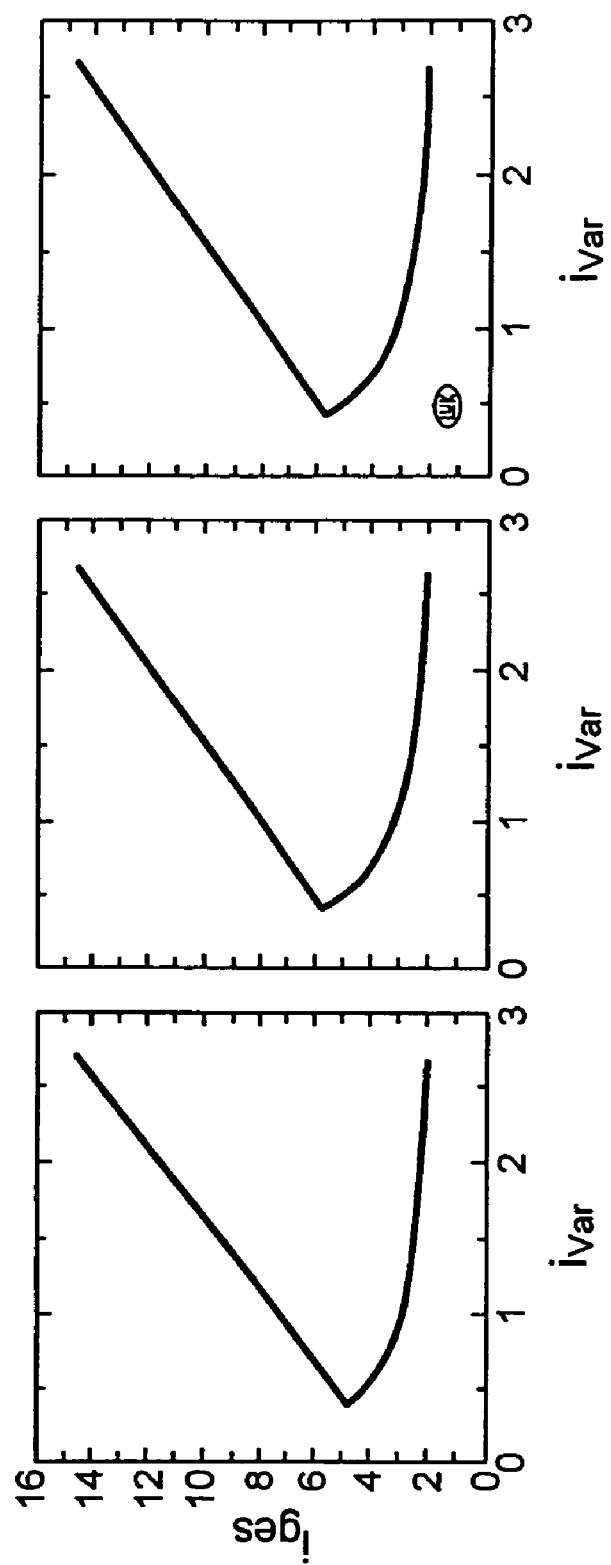

In FIG. 5 the overall transmission ratio $i_{ges}$ (ordinate) for the variations 1, 4, and 5 is shown as a function of the variator transmission ratio (abscissa). The left graph shows variation 1, the center graph variation 4, and the right graph variation 5. As can be seen, the courses for variations 4 and 5 are identical. In all variations the range change takes place at approximately $i_{var}=0.4$, however at a lower overall transmission ratio for variation 1. Because of the power branching the linear part of the curves of FIG. 5 is also in that range (Low range) no originating straight line. Through the power-branching in both driving ranges it is possible to bring the maximum and minimum values of the rotational speeds of both disk pairs, or the input shaft 20 and output shaft 22 of the variator, to a similar level.

Figure 6:
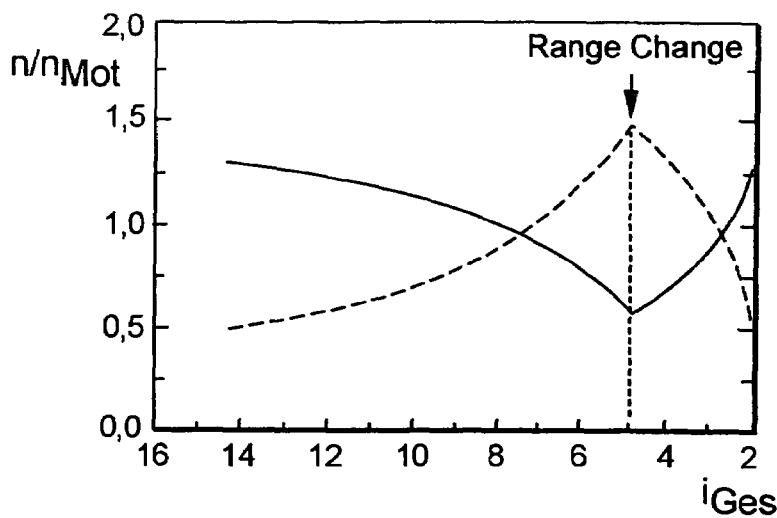

That is shown in FIG. 6 for variation 1, whereby the ordinates in each case designate the ratio between the rotational speed of a disk pair and the rotational speed of the input shaft 6, and the abscissa designates the overall transmission ratio $i_{ges}$. The continuous curve gives the ratios for the first disk pair 16, the dashed curve for the disk pair 18. The minimum and maximum values vary in the example shown between about half and about 1.5 times the engine rotational speed. The second disk pair 18 can thereby be brought to a considerably lower rotational speed level, especially at the range change point, at which the lowest variator transmission ratio can be achieved, whereby the chain damage can be significantly reduced because of reduced centrifugal forces and the lower dynamic effects. That is clearly important with respect to modern engines, which have higher maximum rotational speeds. A further advantage of the lower rotational speeds lies in that in some of the variations of FIG. 4 a centrifugal oil compensation can be eliminated and therefore an advantage in costs is achieved.

Figure 7:
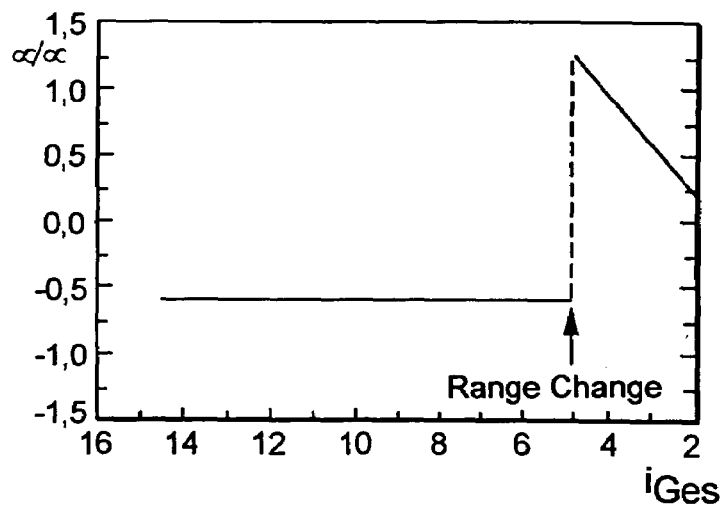

FIG. 7 shows the effective torque at the first disk pair for variation 1, in relation to the torque (ordinate) acting from the engine, as a function of the overall transmission ratio (abscissa). As can be seen, the torque effective in both driving ranges at the first disk pair due to the power-branching is only higher in a narrow transmission ratio range around the range change point than the engine torque. Thereby, numerous further advantages are achieved:

The contact force on the endless torque-transmitting means can be lowered to the same extent as the torque to be transmitted by the variator is reduced. Thereby, the loads on the rocker links and the tensions in the links of the revolving plate-link chain are reduced, whereby the lifetime of the chain is increased.

Because of the low torque level, reduced contact pressure is possible, whereby both the direct frictional contact between the chain and the conical surfaces and the contact pressure to be applied to the adjustment disk is reduced. This causes a reduced energy consumption of the variator, as well as of the pressure hydraulic, and lowers the fuel consumption.

High torque at the conical disk pairs demands high strength of the shafts. By means of the reduced torque level those requirements are reduced so that further spread increases are possible.

Figure 1A:
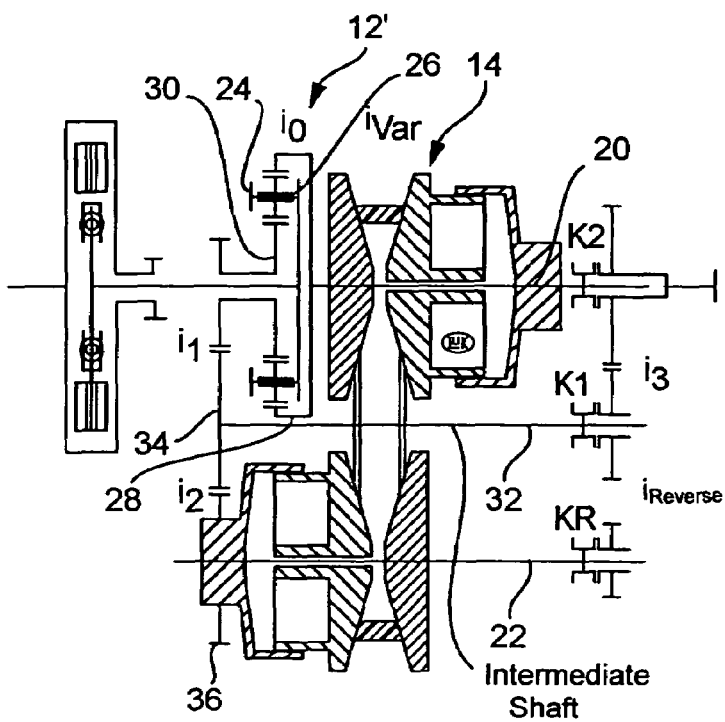
Figure 11:
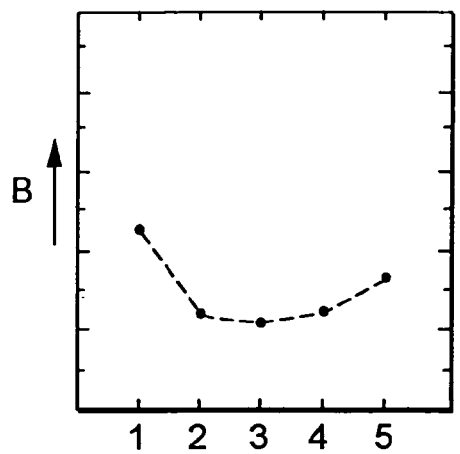

An analysis of the six transmission configurations shown in FIG. 5 has shown that with respect to possibly occurring chain damage, and a resulting lifetime of the chain, variation No. 4 can be especially advantageous. In FIG. 11, therefore the load B of the chain is shown by way of example for variation 4 at a fixed stationary transmission ratio −1.5 of the distributor transmission as a simple planetary transmission 12' (see FIG. 1a) for various parameter sets 1–5 of the design. The minimal chain damage is achieved with a design in accordance with parameter set No. 3. That corresponds to the following transmission ratios: stationary transmission ratio io=−1.5, fixed transmission ratio i1=i3=−1.414, i2=−1.871, as well as the axle transmission ratio iAxle=3.623. Designs for the transmission ratios diverging from that parameter set always result in an increase in the chain load in accordance with FIG. 11. That parameter set is therefore especially advantageous. For a special setting of the transmission, parameter sets with higher loads can also be advantageous, as are for example possible in parameter set designs with respect to loads between about 2.5 and 3.0, as long as the maximum engine torque is adjusted accordingly.

Figure 12:
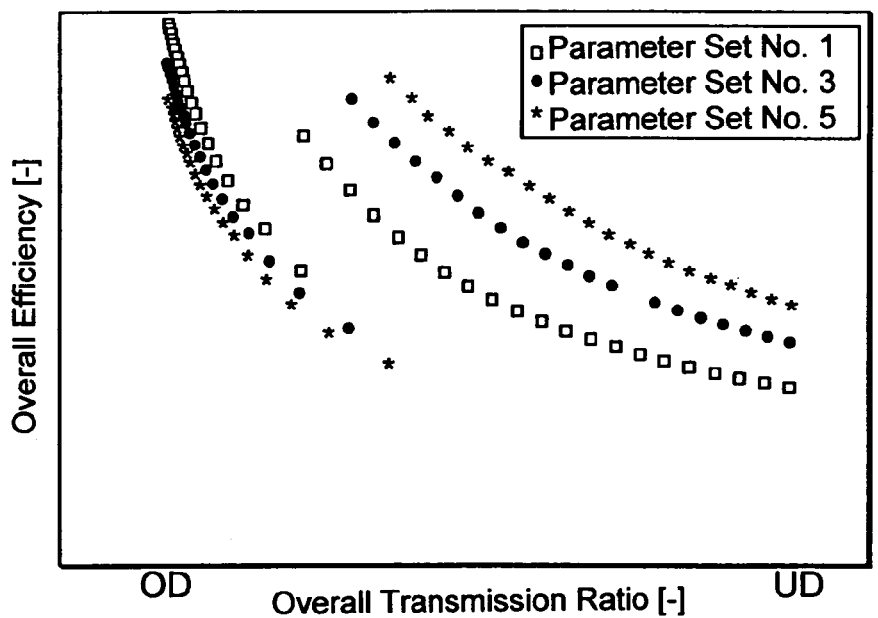

FIG. 12 shows the curve corresponding to parameter set 3 of the overall efficiency of the overall transmission ratio starting from overdrive OD to underdrive UD. It will be evident that parameter set No. 3 has the most even curve and from that perspective is likewise very advantageous.

Experimental and theoretical analyses have furthermore shown that for the changes with respect to time of the variator transmission ratio, for which the relation $$\frac{di_{Var}}{dt} = \frac{di_{Var}}{di_{Ges}} \times \frac{di_{Ges}}{dt}$$

applies, whereby $di_{Ges}/dt$ designates the target overall transmission ratio, improvements can be achieved with the transmission configurations shown in FIG. 4 as compared with other power-branched transmissions, in which the planetary transmission or the planetary coupled transmission are arranged behind the variator, for example.

An important aspect of power-branched transmissions is the comfort of the range shift, which takes place at the synchronous point (the same overall transmission ratios with engaged clutch K1 and with disengaged clutch K2, as well as with disengaged clutch K1 and engaged clutch K2).

Preferably, the shift of the clutches is not noticeable. A characteristic feature of power-branched transmissions is the change in the dynamic output of the inertial masses arranged in the power train at the range shift, which results from the different accelerations of the inertial masses in both driving regions. Already through the skilled selection and design of the overall transmission structure (individual transmission ratios i) the influence on the transmission ratio path, and thereby the change in the dynamic output portions at the range change point can be established.

For the present transmission structures the rotational speeds of the first disk pair 16 (SS1), and the second disk pair 18 (SS2) are given by the equations:

$$n_{SS1} = n_{Mot} \times i_{Var} \times f(i_{Var})$$

$$n_{SS2} = n_{Mot} \times f(i_{Var})$$

whereby $n_{Mot}$ is the rotational speed of the engine or the input shaft 6, $i_{var}$ is the variator transmission ratio, and $f(i_{var})$ is a function of the variator transmission ratio.

A special feature of the present transmission with power-branching in the low and high ranges is the dependency of the rotational speed of disk set 1, $n_{SS1}$, on the variator transmission ratio $i_{var}$. The function $f(i_{var})$ depends on the respective variation (FIG. 4). Besides the variator transmission ratio, the function f depends the individual transmission ratios i.

The dynamic outputs $P_{dyn,SS1}$ and $P_{dyn,SS2}$ for disk pairs 16 and 18 can be calculated with the equations for $n_{SS1}$ and $n_{SS2}$, whereby for variation 4 of FIG. 4, for example the equations $$P_{\text{dyn},SS1} = \theta_{SS1} \cdot n_{Mot} \cdot i_{Var}^2 \cdot f(i_{Var})^2 \frac{dn_{Mot}}{dt} +$$

$$\theta_{SS1} \cdot n_{Mot}^2 \cdot i_{Var} \cdot f(i_{Var}) \cdot \left[ i_{Var} \cdot \frac{\partial f}{\partial i_{Var}} + f \right] \cdot \frac{\partial i_{Var}}{\partial i_{Ges}} \cdot \frac{di_{Ges}}{dt}$$

$$P_{\text{dyn},SS2} = \theta_{SS2} \cdot n_{Mot} \cdot f(i_{Var})^2 \frac{dn_{Mot}}{dt} +$$

$$\theta_{SS2} \cdot n_{Mot}^2 \cdot i_{Var} \cdot f(i_{Var}) \cdot \frac{\partial f}{\partial i_{Var}} \cdot \frac{\partial i_{Var}}{\partial i_{Ges}} \cdot \frac{di_{Ges}}{dt}$$

apply, whereby $\theta_{SS1}$ and $\theta_{SS2}$ represent the mass moments of inertia of disk pair 16 and disk pair 18. The differing transmission ratio paths $i_{var}(i_{Ges})$ in the High and Low ranges as well as the unsteadiness in the derivation $di_{var}/di_{Ges}$ at the range change point are responsible for the fact that $P_{dyn,SS1}$ as well as $P_{dyn,SS2}$ have jumps at the range change point. The magnitude of the jump can be given directly by means of the above formulas. Apart from $dn_{Mot}/dt$ and $di_{Ges}/dt$ (which are determined for a specific motor vehicle) all other values are a function of the transmission pattern and its design. The objective is to select the overall transmission and the design in such a way that the jump magnitudes are a minimum at the range change point, whereby this must of course be in agreement with other objectives, such as the demand for minimum chain damage.

A further aspect is the occurrence of high $P_{dyn}$-values at the first disk pair 16 or the second disk pair 18 in the different driving ranges. An advantage of the present transmission structure is that the $P_{dyn}$ unsteadiness at the range change point is less distinct than in other structures. At the range change in the structure in accordance with the invention, the acceleration process of a disk set is indeed concluded or even reversed, nevertheless at the range change an acceleration process of the other disk set is started simultaneously, or a braking process is reversed into an acceleration process. Both processes together lead to a steady power flow from the transmission input to the transmission output, thus to a comfortable range change.

Figure 8:
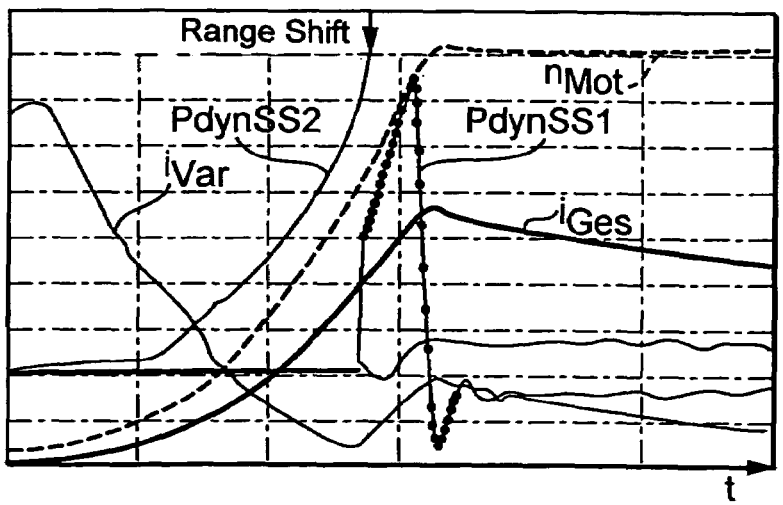

FIG. 8 shows the conditions of a kickdown downshift, by way of example, which is performed in a cycle relevant to the customer, for a transmission of variation 4 of FIG. 4. Shown are the curves for $n_{Mot}$, $i_{var}$, $i_{Ges}$, $P_{dyn,SS1}$, and $P_{dyn,SS2}$, whereby time runs from left to right on the abscissa. The unsteadiness in $P_{dyn,SS1}$ and $P_{dyn,SS2}$ at the range shift are clearly visible. That type of unsteadiness can be prevented by a suitable design. Furthermore, it can be seen that those types of unsteadiness have various directions, so that they partially compensate each other.

An analysis shows that through the suitable selection of the rotary masses, that is, the mass moments of inertia, the jump magnitudes can be changed in such a way that the total of the dynamic output of both disk sets together runs steadily. Thereby, even an increase in the compensation up to a complete compensation can be constructed by way of design. In the transmission shown here it is advantageous to make the rotary mass of the disk set 1 about twice as large as the rotary mass of the disk set 2.

On the basis of FIG. 1, the construction possibilities can be shown for realizing that condition. Advantageously, a small flywheel can be provided on the fist disk set shaft 20, for example. Likewise, it is advantageous to reduce the mass moment of inertia at the second disk set shaft 22 by means of a hollow shaft or by hydraulic chambers 18 constructed radially small. It would be advantageous not to place the clutch K1 in the vicinity of the gear 38, but in the vicinity of the gear 34, that is, as close as possible to the second disk set 22, so that as little rotary mass of the intermediate shaft 32 as possible has to be considered as pertaining to the second disk set 22. The same applies for clutch KR.

The power-branched transmission in accordance with the invention with steplessly adjustable transmission ratio, which operates with three shafts and with the aid of a distributor transmission arranged upstream of the variator, operates constantly power-branched in two shiftable forward ranges, is not limited to a simple planetary transmission as a distributor transmission as described on the basis of FIGS. 1 and 4.

Figure 9:
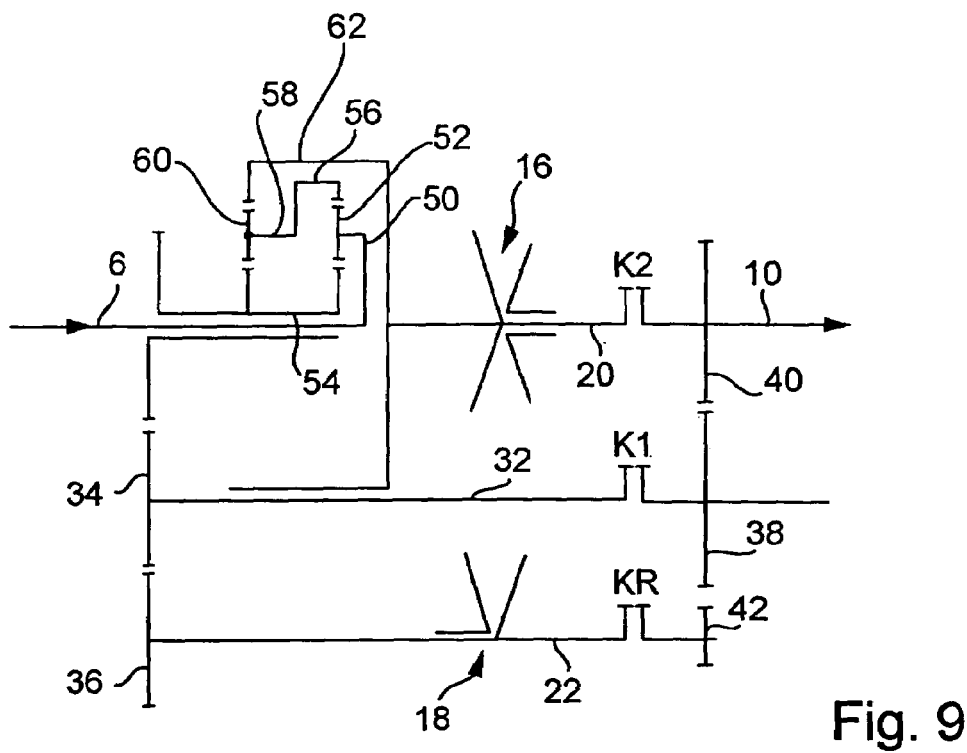

FIG. 9 shows, in a simplified representation as compared with FIG. 1, a further embodiment of a distributor transmission, whereby in the following only the deviations as compared with the embodiment in accordance with FIG. 1 are explained.

In accordance with FIG. 9, the input shaft 6 is first of all nonrotatably connected to the planet carrier 50 of a first planetary step similar to the embodiment in accordance with FIG. 1, whose planet gears 52 mesh with a first outer tooth system of a sun gear 54 and the internal tooth system of a ring gear 56, which is nonrotatably connected or integral with the planet carrier 58 of a further planetary step.

The planet gears 60 of the further planet carrier 58 mesh with a further outer tooth system of the sun gear 54, which can be equal to or different from the first outer tooth system, and mesh further with the internal tooth system of a ring gear 62, which is nonrotatably connected with the input shaft 20. A further outer tooth system of the sun gear 54 meshes with the intermediate gear 34, which, as in FIG. 1, is nonrotatably connected with the intermediate shaft 32.

Figure 10:
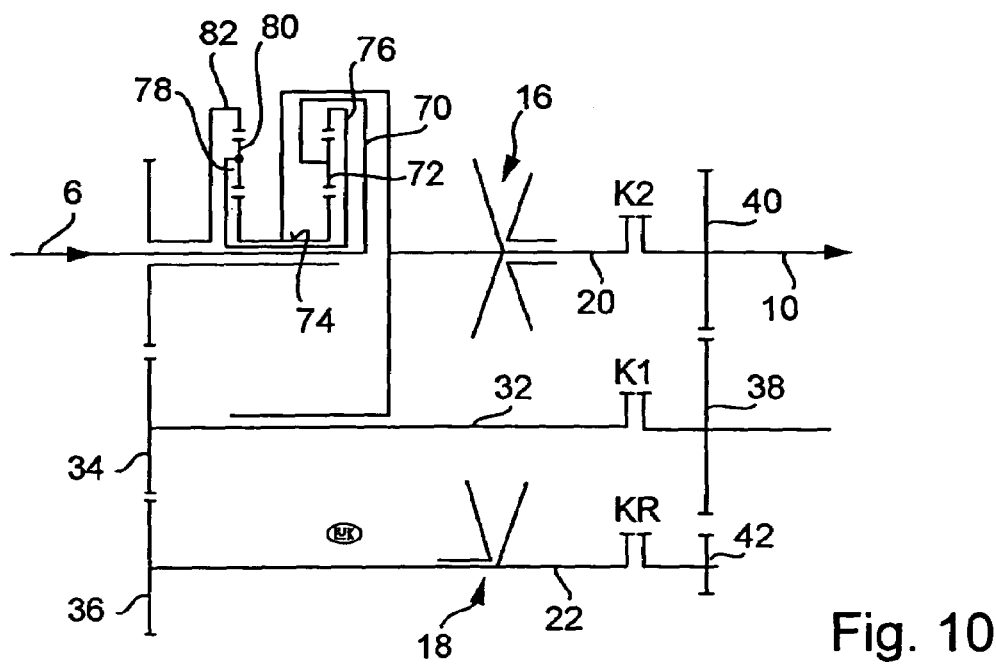

FIG. 10 shows a modified embodiment of a distributor transmission as compared with FIG. 9 with two planetary steps.

In the embodiment in accordance with FIG. 10 the input shaft 6 is nonrotatably connected or is in one piece with a planet carrier 70, whose planet gears 72 mesh with a first outer tooth system of a sun gear 74 and with the internal tooth system of a ring gear 76, which is nonrotatably connected or is in one piece with a further planet carrier 78. The planet gears 80 of the further planet carrier 78 mesh with a further outer tooth system of the sun gear 74, which is nonrotatably connected or is in one piece with the input shaft 20. The planet gears 80 further mesh with the internal tooth system of a ring gear 82, which is constructed with an outer tooth system that is in meshing engagement with the intermediate gear 34.

Figure 1B:
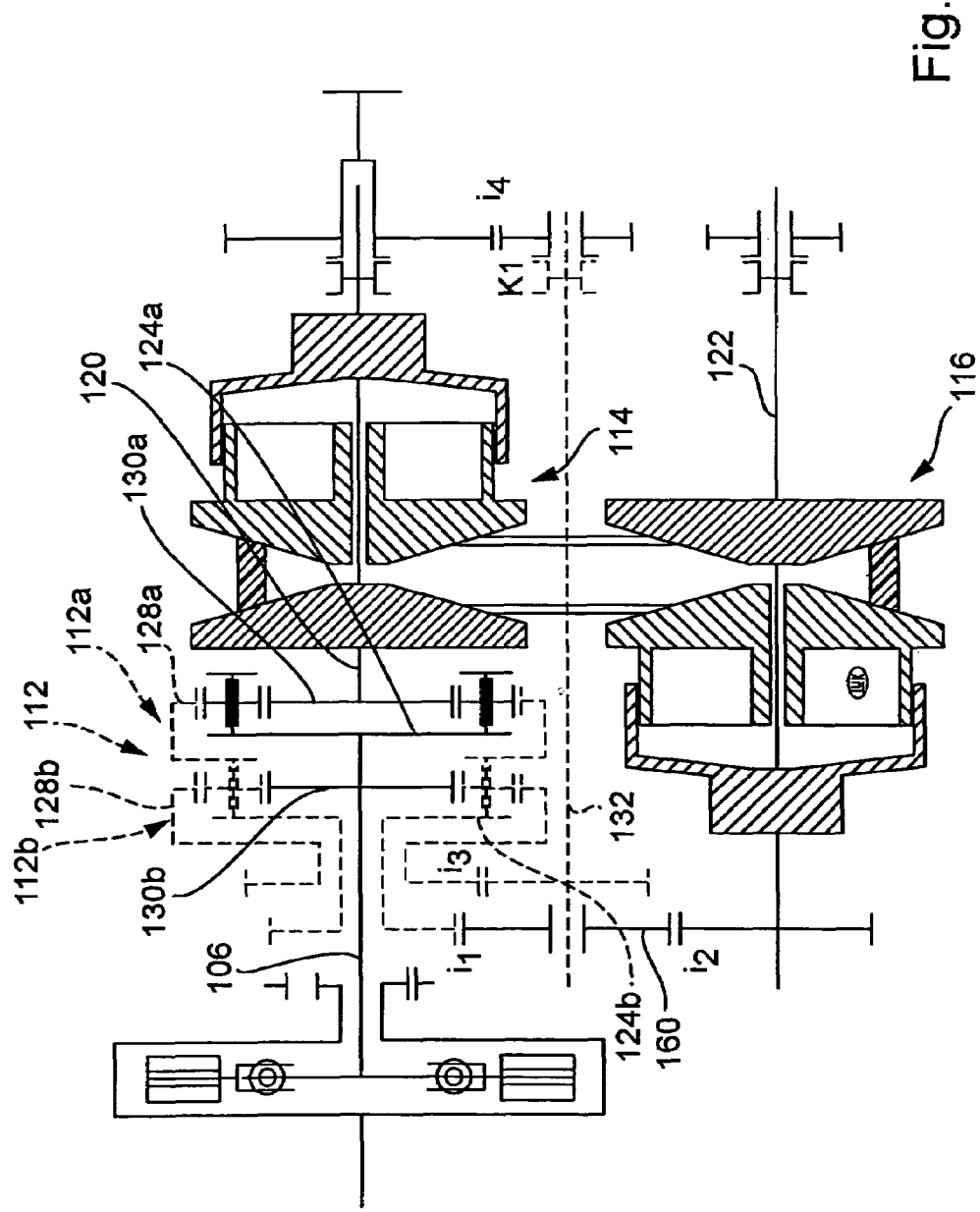
Figures 2, 3:
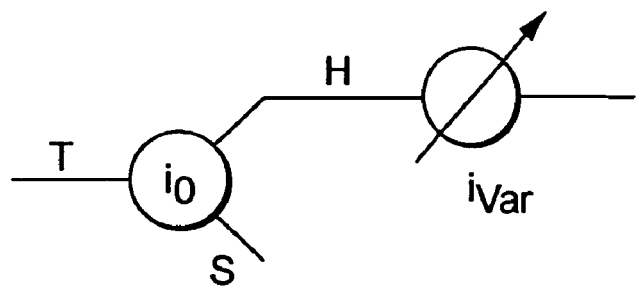
FIG. 2 shows the transmission in accordance with FIG. 1a in a simplified shift diagram, whereby T designates the planet carrier, H the ring gear, and S the sun gear.
FIG. 3 shows the shift diagram of the transmission in accordance with FIG. 1. For reverse travel (R) the clutch KR is engaged, and the clutches K1 and K2 are disengaged.
Figure 13:
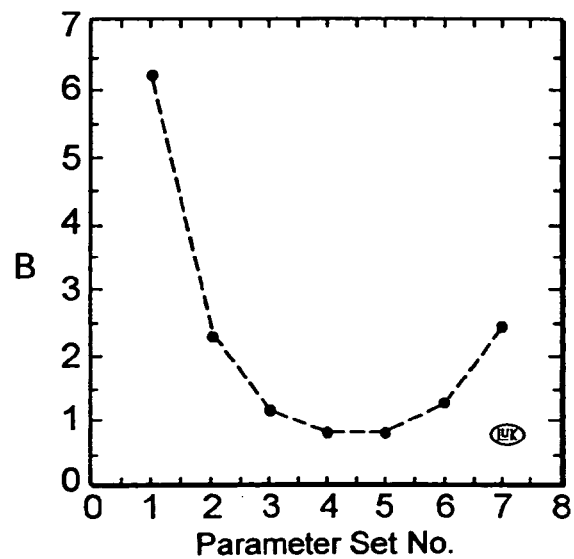

FIG. 13 shows a load B on the chain for a transmission utilizing a coupling transmission 112, as shown in the embodiment illustrated in FIG. 1*b*. The stationary transmission ratios of both planetary transmissions 112*a*, 112*b*, were thereby set to 2.5; for the product of the fixed transmission ratios i1 and i2 the result is i1*i2=0.849, for the product of the fixed transmission ratios i3 and i4 the result is i3*i4=2.070. The axle transmission ratio i(Axle) is 3.775. That results in a variator spread between 2.308 and 0.433. The resulting load on the chain gives the lowest load for parameter set 4, on which those values are based. The remaining parameter sets can also be advantageous for corresponding exemplary embodiments.

It is evident that the described embodiments are only examples, and further variations of coupling transmissions with a variator for the representation of a three-shaft transmission in accordance with the invention are combinable.

What is claimed is:

1. A power-branched transmission with a steplessly adjustable transmission ratio, comprising:
   an input side distributor transmission with an input gear nonrotatably connected with an input shaft,
   a variable speed drive unit including an input shaft and an output shaft that is radially spaced from and parallel to the input shaft, wherein each of the input and output shafts of the variable speed drive unit is operatively connected with the distributor transmission,
   an output shaft of the power-branched transmission, and
   at least two clutches positioned between a power-branched transmission output shaft and the distributor transmission input shaft, whereby
   the input gear of the distributor transmission is in rotational engagement with the input shaft of the variable speed drive unit through at least one gear of the distributor transmission,
   an output gear of the distributor transmission is rotatably coupled with an intermediate shaft arranged functionally in parallel to the input and output shafts of the variable speed drive unit, wherein the intermediate shaft is also rotatably coupled with the output shaft of the variable speed drive unit,
   the intermediate shaft is rotatably coupled with the output shaft of the power-branched transmission through a first clutch, and
   the input shaft of the variable speed drive unit is rotatably coupled with the output shaft of the power-branched transmission through a second clutch.

2. A power-branched transmission in accordance with claim 1, wherein the distributor transmission is a planetary transmission.

3. A power-branched transmission in accordance with claim 1, wherein the distributor transmission is a pair of operatively coupled planetary transmissions.

4. A power-branched transmission with a steplessly adjustable transmission ratio, comprising:
   an input side distributor transmission with an input gear nonrotatably connected with an input shaft,
   a variable speed drive unit including an input shaft and an output shaft operatively connected with the distributor transmission,
   an output shaft of the power-branched transmission, and
   at least two clutches positioned between a power-branched transmission output shaft and the distributor transmission input shaft, whereby
   the input pear of the distributor transmission is in rotational engagement with the input shaft of the variable speed drive unit through at least one gear of the distributor transmission,
   an output pear of the distributor transmission is rotatably coupled with an intermediate shaft arranged functionally in parallel to the variable speed drive unit, wherein the intermediate shaft is also rotatably coupled with the output shaft of the variable speed drive unit,
   the intermediate shaft is rotatably coupled with the output shaft of the power-branched transmission through a first clutch,
   the input shaft of the variable speed drive unit is rotatably coupled with the output shaft of the power-branched transmission through a second clutch, and wherein the distributor transmission input shaft is nonrotatably connected with a first planet carrier having first planet gears that are in rotational engagement with a first sun gear that is in rotational engagement with the intermediate shaft, and wherein the first planet gears are in rotational engagement with a first ring gear that is nonrotatably connected with a second planet carrier having second planet gears that are in rotational engagement with the first sun gear and with a second ring gear that is nonrotatably connected with the input shaft of the variable speed drive unit.

5. A power-branched transmission with a steplessly adjustable transmission ratio, comprising:
   an input side distributor transmission with an input gear nonrotatably connected with an input shaft,
   a variable speed drive unit including an input shaft and an output shaft operatively connected with the distributor transmission,
   an output shaft of the power-branched transmission, and
   at least two clutches positioned between a power-branched transmission output shaft and the distributor transmission input shaft, whereby
   the input gear of the distributor transmission is in rotational engagement with the input shaft of the variable speed drive unit through at least one gear of the distributor transmission,
   an output gear of the distributor transmission is rotatably coupled with an intermediate shaft arranged functionally in parallel to the variable speed drive unit, wherein the intermediate shaft is also rotatably coupled with the output shaft of the variable speed drive unit,
   the intermediate shaft is rotatably coupled with the output shaft of the power-branched transmission through a first clutch,
   the input shaft of the variable speed drive unit is rotatably coupled with the output shaft of the power-branched transmission through a second clutch, and wherein the distributor transmission input shaft is nonrotatably connected with a first planet carrier having first planet gears that are in rotational engagement with a first sun gear that is in rotational engagement with the intermediate shaft, and wherein the input shaft is nonrotatably connected with a first planet carrier having first planet gears that are in rotational engagement with a first sun gear and a first ring gear, wherein the first sun gear is nonrotatably connected with the input shaft of the variable speed drive unit, and the first ring gear is nonrotatably connected with a second planet carrier having second planet gears that are in rotational engagement with the first sun gear and with a second ring gear that is in rotational engagement with the intermediate shaft.

6. A power-branched transmission in accordance with claim 1, wherein the output shaft of the variable speed drive unit is operatively coupled with a reverse gear through a reverse drive clutch.

7. A power-branched transmission with a steplessly adjustable transmission ratio, comprising:
   an input side distributor transmission with an input gear nonrotatably connected with an input shaft,
   a variable speed drive unit including an input shaft and an output shaft operatively connected with the distributor transmission,
   an output shaft of the power-branched transmission, and
   at least two clutches positioned between a power-branched transmission output shaft and the distributor transmission input shaft, whereby
   the input gear of the distributor transmission is in rotational engagement with the input shaft of the variable speed drive unit through at least one gear of the distributor transmission,
   an output gear of the distributor transmission is rotatably coupled with an intermediate shaft arranged functionally in parallel to the variable speed drive unit, wherein the intermediate shaft is also rotatably coupled with the output shaft of the variable speed drive unit,
   the intermediate shaft is rotatably coupled with the output shaft of the power-branched transmission through a first clutch,
   the input shaft of the variable speed drive unit is rotatably coupled with the output shaft of the power-branched transmission through a second clutch, and wherein the distributor transmission input shaft is nonrotatably connected with a first planet carrier having first planet gears that are in rotational engagement with a first sun gear that is in rotational engagement with the intermediate shaft, and wherein the transmission ratios between individual gears of the power-branched transmission are selected so that transient jumps of power at a first and a second conical disk pair of the variable speed drive unit are minimum at a transmission ratio range shift resulting from actuation of the first and second clutches.

8. A power-branched transmission with a steplessly adjustable transmission ratio, comprising:
   an input side distributor transmission with an input gear nonrotatably connected with an input shaft,
   a variable speed drive unit including an input shaft and an output shaft operatively connected with the distributor transmission,
   an output shaft of the power-branched transmission, and
   at least two clutches positioned between a power-branched transmission output shaft and the distributor transmission input shaft, whereby
   the input pear of the distributor transmission is in rotational engagement with the input shaft of the variable speed drive unit through at least one gear of the distributor transmission,
   an output gear of the distributor transmission is rotatably coupled with an intermediate shaft arranged functionally in parallel to the variable speed drive unit, wherein the intermediate shaft is also rotatably coupled with the output shaft of the variable speed drive unit,
   the intermediate shaft is rotatably coupled with the output shaft of the power-branched transmission through a first clutch,
   the input shaft of the variable speed drive unit is rotatably coupled with the output shaft of the power-branched transmission through a second clutch, and wherein the distributor transmission input shaft is nonrotatably connected with a first planet carrier having first planet gears that are in rotational engagement with a first sun gear that is in rotational engagement with the intermediate shaft, and wherein a rotary mass that determines the power input is increased at a change of a transmission ratio range, so that a jump of the overall power input at the range change point is negligible.

9. A power-branched transmission with a steplessly adjustable transmission ratio, comprising:
   an input side distributor transmission with an input gear nonrotatably connected with an input shaft,
   a variable speed drive unit including an input shaft and an output shaft operatively connected with the distributor transmission,
   an output shaft of the power-branched transmission, and
   at least two clutches positioned between a Dower-branched transmission output shaft and the distributor transmission input shaft, whereby
   the input pear of the distributor transmission is in rotational engagement with the input shaft of the variable speed drive unit through at least one gear of the distributor transmission,
   an output gear of the distributor transmission is rotatably coupled with an intermediate shaft arranged functionally in parallel to the variable speed drive unit, wherein the intermediate shaft is also rotatably coupled with the output shaft of the variable speed drive unit,
   the intermediate shaft is rotatably coupled with the output shaft of the power-branched transmission through a first clutch,
   the input shaft of the variable speed drive unit is rotatably coupled with the output shaft of the power-branched transmission through a second clutch, and wherein the distributor transmission input shaft is nonrotatably connected with a first planet carrier having first planet gears that are in rotational engagement with a first sun gear that is in rotational engagement with the intermediate shaft, and wherein a rotary mass that determines the power input is decreased at a change of a transmission ratio range, so that no jump of the overall power input at the range change point occurs.

10. A power-branched transmission according to claim 8, wherein a change of rotary masses within the power-branched transmission is achieved in that an installation location of the clutches is selected so that as much rotary mass as possible is coupled.

11. A power-branched transmission according to claim 8, wherein a change of rotary masses within the power-branched transmission is achieved in that an installation location of the clutches is selected so that as much rotary mass as possible is uncoupled.

* * * * *